Figure 1:
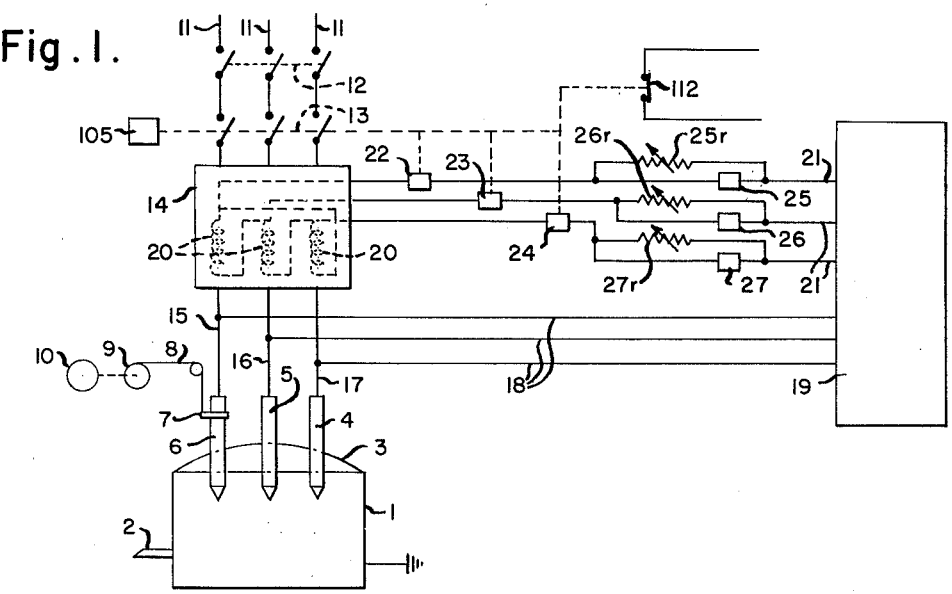

Nov. 9, 1965   G. A. BENNETT   3,217,205
ELECTRIC FURNACE ELECTRODE POSITION CONTROL
Filed June 7, 1962   2 Sheets-Sheet 1

INVENTOR
George A. Bennett
his attorneys ganged with
40, 52 & 57 to relay 78 or 79

United States Patent Office 3,217,205
Patented Nov. 9, 1965

3,217,205
ELECTRIC FURNACE ELECTRODE POSITION CONTROL
George A. Bennett, Beaver Falls, Pa., assignor, by mesne assignments, to Pullman Incorporated, Pittsburgh, Pa., a corporation of Delaware
Filed June 7, 1962, Ser. No. 200,715
12 Claims. (Cl. 314—75)

This invention relates to the control of the position of electrodes used in electric furnaces such as those employed for heating and refining steel and the like.

The use of electric furnaces is old and well known in the steel industry and elsewhere. Electric furnaces are commonly built with a plurality of electrodes which extend downwardly through openings in the roof of the furnace and terminate within the furnace. The furnace may ordinarily be tilted for pouring and the electrodes may be withdrawn so that the roof can be swung to one side for charging. A high current at relatively low voltage is employed, an arc being struck from an electrode to the metal or bath in the furnace by bringing the electrode into contact with the metal or bath and then withdrawing it to maintain the arc with the proper current and voltage for steady operating conditions. It is necessary to adjust the electrodes to compensate for attrition at their lower ends and to meet varying operating conditions within the furnace. In the case of refining of steel it is quite common to charge substantial quantities of scrap which are of high bulk and relatively low density. As the scrap becomes molten and is absorbed into the molten metal, it sinks down and occupies a significantly smaller volume than it would as scrap metal. It is sometimes necessary to charge a furnace with scrap, to melt down the scrap, and then to recharge with more scrap in order to obtain enough metal for a full charge.

It is apparent and is well known that the ordinary refining process requires regular adjustment of the electrodes due to their attrition and to variations in operating conditions. Numerous schemes have been proposed to automatically adjust the electrodes in accordance with the current and voltage. This has been done heretofore, causing the electrodes to be raised or lowered in accordance with the voltage on the electrodes and the current being supplied to the furnace. These proposals have failed to deal with many conditions which are undesired or irregular but which are nevertheless experienced in the course of furnace operation. For example, the electrodes will commonly bore down into a pile of scrap in the furnace melting the scrap adjacent each electrode. Sometimes the melting of some scrap causes the scrap surrounding an electrode to collapse or cave in when the supporting scrap reaches a semi-fluid condition. The caving may force some of the scrap closer to the electrode, reducing the length of the arc and causing a sudden surge of current. Conventional equipment has been unable to accommodate the surge with the result that the furnace circuit breaker is tripped causing loss of furnace operating time and requiring that the furnace remain shut down until an operator is able to restore it to operation. Where a battery of furnaces are under the control of one operator, some of them may be shut down for prolonged periods of time if several furnaces are disconnected by opening of the circuit breaker or otherwise require attention at nearly the same time.

I provide new and useful means to obviate many of the disadvantages of the schemes used heretofore. I provide electrode drive means operable to raise and lower the electrodes of an electric furnace. I further provide electrode voltage and current sensing means in controlling relationship to said electrode drive means. I preferably provide additional electrode current sensing means in controlling relationship to the electrode drive means and effective to cause the electrode drive means to raise the electrodes when there is an excessive electrode current regardless of the operation of the electrode voltage and current sensing means. I further preferably provide timer means in controlling relationship to the electrode drive means to cause the electrodes to be raised after a pre-set period of time. I prefer to provide second timer means to reset the first timer means if the furnace heating is interrupted for more than a predetermined period of time. I preferably provide circuit breaker means and prefer to provide means operated by the circuit breaker means when they are tripped by an excessive current to control the electrode drive means to raise the electrodes, to close the circuit breaker means and to restore the electrode drive means to normal operation.

Other details, objects and advantages of my invention will become apparent as the following description of a present preferred embodiment thereof proceeds.

Figure 2:
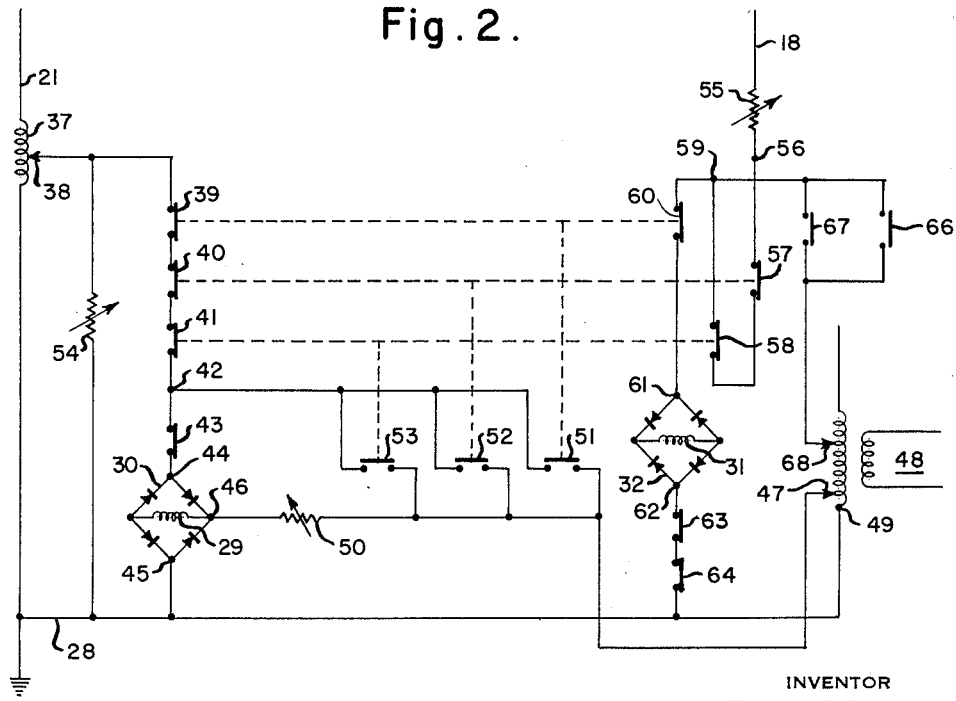
Figure 3:
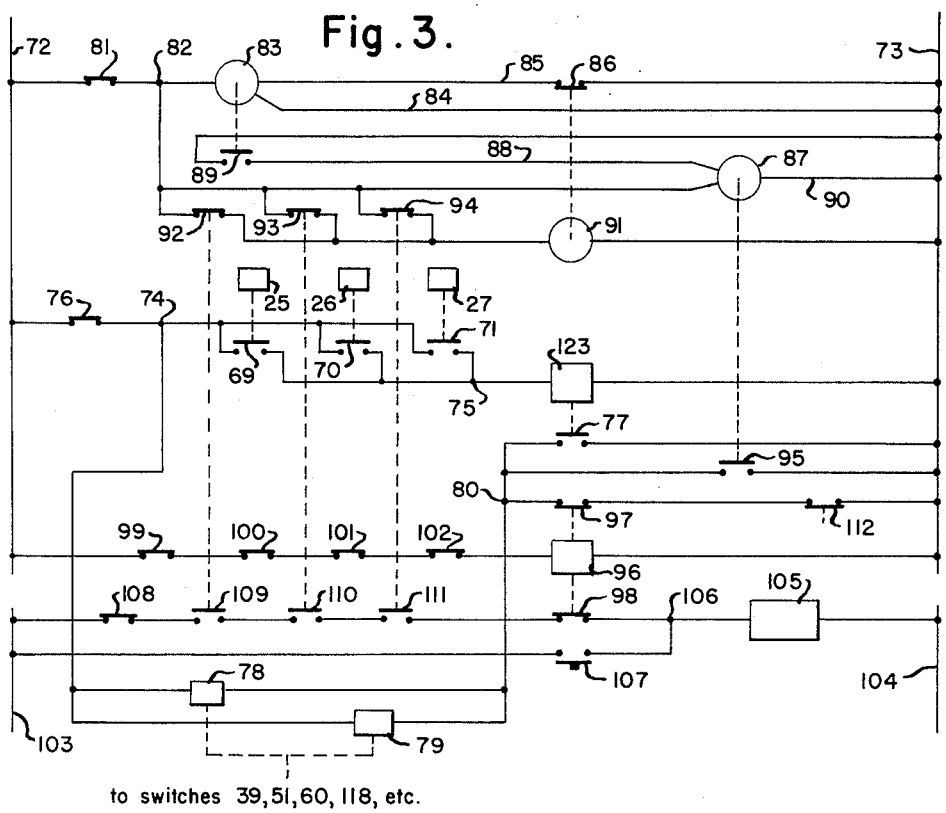
Figure 4:
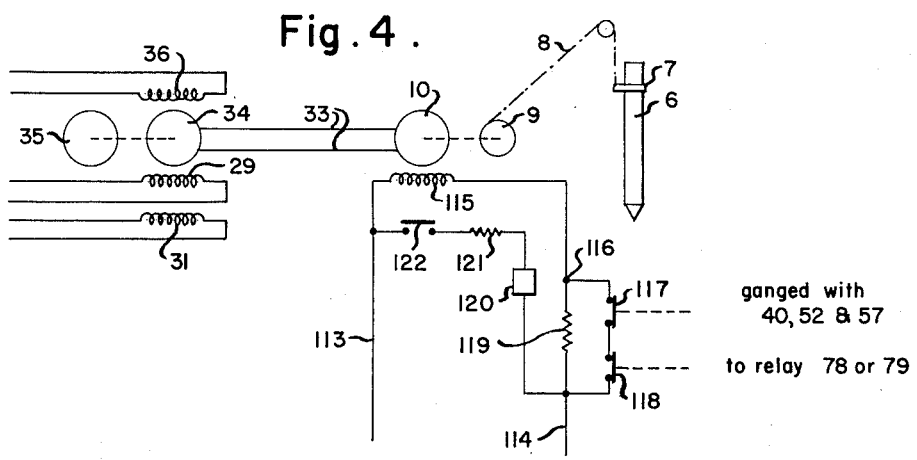

In the accompanying drawings I have illustrated a present preferred embodiment of my invention in which FIGURE 1 schematically shows an electric furnace apparatus embodying my invention in which certain of the electrical control apparatus is illustrated;

FIGURE 2 shows the electrode raising and lowering bias control circuits for one electrode;

FIGURE 3 schematically shows the timing circuits and some of the overriding control circuits for the system; and FIGURE 4 shows the electrode hoisting apparatus and control coils for one of the electrodes.

Referring now to FIGURE 1, an electric furnace 1 is illustrated in outline form. It is mounted to be tilted so that refined metal can be poured through spout 2, and it has a roof 3 which is swung back to open the furnace for charging. Three electrodes, 4, 5 and 6, are provided and arranged in a conventional manner. An electrode holder 7 holds electrode 6 clamped to it. The electrode is ordinarily held tightly in holder 7, but is loosened and electrode 6 slipped downwardly in it from time to time as the bottom of the electrode is worn away by normal usage. When an electrode has been consumed, the end is removed and a new electrode inserted in the holder. Electrode holder 7 is adjustably raised and lowered by a cable 8 connected to a winch 9 driven by a motor 10. Each of the electrodes 4 and 5 likewise has an electrode clamp and a hoisting arrangement of the same type but they have been omitted from the drawings for purposes of clarity.

Power is supplied to the furnace from a three phase line 11 having a main disconnect switch 12. A circuit breaker having a switch 13 is provided in the supply line. The line leads to a step-down transformer 14 which delivers power to the electrodes through leads 15, 16, and 17. A voltage or potential connection 18 is provided between each of the leads 15, 16, and 17 and the electrode position control apparatus 19 which is described in further detail below and is shown in FIGURES 2 and 3. A current transformer having secondary windings 20 integral with the main transformer 14 is connected by three current connections 21, one for each phase, to electrode position control apparatus 19. Three circuit breaker relays 22, 23, and 24 are provided, one being connected into each of the current connections 21. The circuit breaker relays are set to operate and open circuit breaker switch 13 when the current in any one of connections 21 exceeds a pre-set value indicating that the current in respective lead 15, 16, or 17 is excessive. Such an excess current may be caused by the caving of scrap adjacent the electrodes producing a low resistance circuit. Three overcurrent relays 25, 26, and 27 are provided, one being placed in each of the current connections 21. The operation of these relays is described in detail below.

FIGURE 2 shows the control circuits for one of the electrode raising and lowering mechanisms. One of the current connections 21 and one of the potential connections 18 for the same electrode are shown in FIGURE 2. They deliver two signals for that electrode to the control circuit network. The signal delivered through current connection 21 is proportional to and increases with increases in the current in the associated electrode. A second signal is delivered through potential connection 18 and is proportional to the voltage between the electrode and ground. A ground 28 which is common through the entire circuit network is provided for the signals passing between each of the connections 18 and 21 and ground through parts of the network.

A raise field coil 29 is included within that part of the network between current connection 21 and ground 28. It is placed across a rectifier bridge 30. A lower field coil 31 is placed across a rectifier bridge 32 and included within that part of the network between potential connection 18 and ground 28. Each of the electrode winch motors 10 is connected by wires 33 (FIGURE 4) to a generator 34 driven by motor 35. The generator is provided with three field winding coils 29, 31, and 36. A stabilizing field coil 36 is continuously connected to a power supply. Raise field coil 29, when it is energized, develops a field which tends to cause an output from the generator which urges motor 10 to raise electrode 6. Lower field coil, when it is energized, tends to cause an output urging motor 10 to lower electrode 6. Coils 29 and 31 are oppositely wound so that a field developed by one winding will offset a field developed by the other. Accordingly, when both are energized, the net field and accordingly the actual generator output (setting aside the effect of the stabilizing field) is proportioned to the difference between the two fields. If the raise field is stronger than the lower field, motor 10 will urge the associated electrode upwardly. If the lower field is stronger, motor 10 will urge the associated electrode downwardly. The effect of the stabilizing field is a constant one which is compensated for by other adjustments within the system.

Current connection 21 (FIGURE 2) is connected to ground through the windings 37 of an auto-transformer. A tap 38 on auto-transformer 37 is connected through the network to ground 28. One of the connections from tap 38 is through a control switch 39 operated in conjunction with other switches by a control relay which is described further below. The connection is then through master raise switch 40 and individual raise switch 41 to a terminal 42. Master raise switch 40 is operated with other master raise switches from a single control to raise all electrodes simultaneously. Individual raise switch 41 is operated with other individual raise switches from a single control to raise only a single electrode independently of the other two electrodes. From terminal 42 one connection leads through electrode upper limit switch 43 to terminal 44 of rectifier bridge 30. Electrode upper limit switch 43 is normally closed but is opened by electrode holder 7 if it reaches a point of maximum elevation. Terminal 45 of rectifier 30 opposite to terminal 44 is connected to ground 29. Terminal 46 of rectifier bridge 30, intermediate terminals 44 and 45, is connected to one end of raise field coil 29 and also to a tap 47 of an isolating transformer 48 whose secondary winding is connected to ground 28 at terminal 49. A variable resistor 50 is provided between terminal 46 and tap 47.

Terminal 42 is connetced to the wire which connects tap 47 and variable resistor 50 through three normally open switches 51, 52, and 53 which are arranged in parallel. Control switch 51, which is normally open, is operated by a control relay which is described below. Master raise switch 52, which is normally open, is ganged with normally closed master raise switch 40. Individual raise switch 53 which is normally open, is ganged with normally closed individual raise switch 41. A variable resistor 54 is connected directly between tap 38 of auto-transformer 37 and common ground 28.

Potential connection 18 is connected through a variable resistor 55 to a terminal 56. The connection then goes through master raise switch 57 which is normally closed. Switch 57 is ganged with normally open master raise switch 52 and normally closed master switch 40. The connection is then made through individual raise switch 58, which is normally closed, and which is ganged with normally open individual raise switch 53 and normally closed individual raise switch 41 to a terminal 59. From terminal 59 a connection is made through normally closed switch 60 operated by a control relay which is described further below. Switch 60 is connected to one terminal 61 of rectifier 32. The opposite terminal 62 is connected to ground 28 through electrode low limit switch 63 and slack cable limit switch 64 which are connected in series. Electrode low limit switch 63 is normally closed but is opened when electrode holder 7 reaches its maximum low position. Slack cable limit switch 64 is normally closed but is opened if hoisting cable 8 goes slack by reason of the electrode and electrode holder being jammed before electrode holder 7 reaches its low limit. That might happen if the electrode were lowered onto a mass of unmelted scrap.

A connection is made from terminal 59 through individual lowering switch 66 and master lowering switch 67. Switches 66 and 67 are connected in parallel to tap 68 of auto-transformer 48. Master lowering switch 67 is controlled with other master lowering switches to lower all of the electrodes simultaneously.

The overcurrent relays 25, 26, and 27 (FIGURES 1 and 3) form a part of the current connections 21, one being placed in each connection. Variable shunt resistances, 25r, 26r, and 27r respectively, are placed around the overcurrent relays to permit a variable part of the current to bypass the relays. When one of the overcurrent relays is energized by an excessive current in the associated current connection 21, indicating an excess electrode current in the connected furnace electrode, the relay operates to close one of normally open switches 69, 70, and 71 which are operated by relays 25, 26, and 27, respectively. Switches 69, 70, and 71 are connected between lines 72 and 73 carrying a 110 volt alternating current for the control circuits. Switches 69, 70, and 71 are connected in parallel between terminal 74 and terminal 75. Terminal 74 is connected to line 72 through selector switch 76 which is normally closed for automatic operation. Terminal 75 is connected through a time delay relay 123 to line 73. Relay 123 closes normally open switch 77 when it is energized longer than a pre-set interval of time. Relay 123 is ordinarily set to operate if it is energized for more than three quarters of a second and to close switch 77 at the end of that interval. It opens switch 77 immediately upon being deenergized. Two control relays 78 and 79 are connected in parallel between terminal 74 and terminal 80. The relays operate a series of control switches throughout the apparatus including switches 39, 51, and 60 (FIGURE 2). Their function is identical but two relays are preferably used in place of one relay since the relays which are conveniently available in the commercial market have only half of the total number of contacts required for the complete furnace apparatus. Three connections are provided from terminal 80 to line 73—through switch 77, through switch 95, and through switches 97 and 112.

A circuit is arranged from line 72 through timer control switch 81 which is normally closed for operation of the automatic timing apparatus to a terminal 82. A melt down timer 83 is connected from terminal 82 through lead 84 to line 73. When timer 83 is energized it makes an internal connection to lead 85, which is connected through normally closed switch 86 to lead 73. After timer 83 is started, it is maintained in operation solely through lead 85 and disconnects itself from lead 84 which is solely for the purpose of making the original circuit. When timer 83 has operated for its pre-set length of time, it closes normally open switch 89. A further circuit is provided from terminal 82 to lead 73 through timer 87. Timer 87 is initially connected through lead 88 to normally open switch 89 and thence to lead 73. When timer 87 is initially energized (switch 89 must be closed) it then transfers to an operating circuit through lead 90 and disconnects from lead 88. Timer 87 controls operation of normally open switch 95 which connects terminal 80 and line 73. Timer 87 closes switch 95 when the timer is energized and maintains it closed for a pre-set period of time after which timer 87 opens switch 95 and resets itself. A connection is also made from terminal 82 through an interruption timer 91 to lead 73. The connection to timer 91 is made through three electrode top limit switches 92, 93, and 94 which are arranged in parallel. Timer 91 operates switch 86 which is normally closed. It opens switch 86 only after it has been energized continuously for a pre-set period of time.

A circuit is provided between lines 72 and 73 for a circuit breaker control relay 96 which operates switch 97 and switch 98 and maintains them normally closed when relay 96 is energized. Relay 96 is energized through circuit breaker lockout switch 99 and individual phase lockout switches 100, 101, and 102 connected in series. Circuit breaker lockout switch 99 is normally closed, but is opened where the operator desires to have the circuit breaker locked out of operation and in open position. Switches 100, 101, and 102 are auxiliary switches on the master control switch for each of the three phases. They are normally closed but are opened when any one of the phases is to be locked out of operation.

A 250 volt direct current supply is provided on lines 103 and 104 for power relay operation. A circuit is established between lines 103 and 104 for circuit breaker closing relay 105 (FIGURES 1 and 3). Circuit breaker closing relay 105 is connected between terminal 106 and line 104. A push-button 107 which is normally open, is pushed to complete a circuit from line 103 to terminal 106 and operate relay 105 for manual closing. A connection is also made between line 103 and terminal 106 through selector switch 108 which is normally closed for automatic reclosing of the circuit breaker, through electrode top limit switches 109, 110, 111, which are ganged with electrode top limit switches 92, 93, and 94, respectively, and then through normally closed switch 98. Switches 108, 109, 110, 111, and 98 are arranged in series, and, when all of them are closed, complete a circuit from line 103 to terminal 106. The pairs of electrode top limit switches 92 and 109, 93, and 110, and 94, and 111, are ganged with the respective raise limit switches in the control network, such as switch 43 (FIGURE 2). The respective switches on each section of the network are opened when the corresponding electrode holder reaches its top position.

Auxiliary switch 112 (FIGURES 1 and 3) is arranged with the main circuit breaker. It is normally open when the circuit breaker is closed. When the breaker is tripped and main switch 13 opens, switch 112 closes completing a circuit from terminal 80 (FIGURE 3) through switch 97 (when it is closed) to line 73.

The electrode hoisting motor has a field energized from lines 113 and 114. Under ordinary conditions a current passes through field coil 115 to terminal 116, then through normally closed master raise switch 117 and normally closed control switch 118. Switch 117 is ganged with switches 40, 52, and 57 and switch 118 is controlled by one of relays 78 and 79. A resistor 119 is connected between terminal 116 and line 114. When either of switches 117 or 118 is opened, the field current is reduced causing an increased speed of motor 10.

Motor 10 is provided with a brake release coil 120 connected between lines 113 and 114 through a resistor 121 and switch 122. Switch 122 is incorporated in the starter for motor 35 of the associated motor generator set and closes when motor 35 is started, completing a circuit through brake release coil 120 and unlocking the brake on the shaft of motor 10.

When furnace 1 is to be placed in operation, electrodes 4, 5, and 6 are withdrawn and roof 3 is swung back to permit the furnace to be charged. The charge in a steel plant, for example, commonly includes a large percentage of scrap metal which is piled up in the furnace well above the eventual level of molten metal. When the charge has been completed, the furnace roof 3 is swung back into position. The motor generator sets for the three electrodes are started and the main disconnect switch 12 and circuit breaker switch 13 are closed. Switches 81, 76, 99, and 108 (FIGURE 3) are also closed for normal operation. When power is applied to transformer 14, a voltage is applied at electrodes 4, 5, and 6. Since they are raised above the scrap metal, no arc will be struck and there is no current flow through the electrodes. The electrodes are, of course, at their maximum potential. Accordingly, there is a current or signal in potential connections 18 which reflects the electrode voltages. Since there is no current in the electrodes, there is no signal in any of current connections 21. Accordingly, for each electrode there is a flow of current between the corresponding potential connection 18 and ground 28 through switches 57, 58, 60, 63, and 64 and through rectifier bridge 32. While only one of the three electrode control networks is illustrated (FIGURE 2) for purposes of simplicity, it is to be understood that a like arrangement and method of operation prevails for the other two phases. A rectified full wave current passes through lower field coil 31 due to the current passing between potential connection 18 and ground and causes a field to be produced in generator 34 such that its output urges motor 10 to lower electrode 6. Since there is no current in current connection 21, there is no current flowing in raise field coil 29 to offset the field produced by coil 31. Motor 10 lowers electrode 6 until an arc is struck, at which time a signal current is produced in current connection 21. A current is then produced between tap 38 and ground 28 through switches 39, 40, 41, and 43 and raise field coil 29. Rectifier 30 produces a full wave direct current in field coil 29. When the arc is first struck, the electrode will ordinarily be too close to the metal for proper operation and a raise field is produced in generator 34 which is stronger than the lower field. This results in withdrawal of electrode 6. As the electrode withdraws, an arc will be pulled from the metal in the furnace to the electrode. As the length of the arc increases, so will its resistance, and the current will be reduced and the electrode voltage to ground will be correspondingly increased. Accordingly, the raise field will become weaker and the lower field will become stronger. When the electrode has reached the proper position, the fields generated by field winding coils 29 (independently of a current in coil 29 supplied by auto-transformer 48 through resistor 50 and discussed below) and coil 31 offset each other so that the electrode is maintained in fixed position.

Variable resistor 55 permits the effect of the potential signal in connection 18 to be varied relative to the current signal. The signal passing through raise field coil 29 may be adjusted relative to the current signal in current connection 21 by adjustment of tap 38 in the auto-transformer. Accordingly, it is possible to achieve a proper balance between the raise and lower fields to maintain the electrode at any desired position for the operating conditions which prevail. A further adjustment may be made by varying the resistance of shunt 54. Auto-transformer 48 supplies a current through tap 47 and through variable resistor 50 to raise field coil 29. Variable resistor 50 is adjusted to produce a current in coil 29 which acts solely to counteract the weight of electrode. It is adjusted to cause generator 34 to supply a sufficient current to motor 10 to hold the weight of the electrode, electrode holder, and associated equipment without pulling it up or moving it down at a time when there is no signal being supplied through either of connections 21 or 18. Accordingly the signals supplied through connections 21 and 18 act to move the electrode independently of its weight, and the weight of the electrode holder, and the like.

It often happens that due to the low density of scrap which is charged, it is not possible to place a full charge in the furnace at one time. It then becomes necessary to charge all available space in the furnace, then to melt down the scrap which has been charged, and then add a fresh charge of scrap on top of the now molten metal. It is, of course, necessary to raise the electrodes and swing the roof back for further charging. To do this the operator activates a master raise switch on the control panel. That opens switches 40 and 57 and closes switch 52. The master raise switch also controls like switches for the other two electrode networks. When the switches have been operated in this manner, coils 29 and 31 are disconnected from voltage and current connections 18 and 21, and transformer 68 is directly connected to coil 29 causing electrode 6 to be raised. Tap 47 is adjusted to deliver a sufficient current to coil 29 to provide a full field for raising the electrode at a maximum speed which is greater than the usual operating speeds. In this manner, the electrode is raised with full voltage applied to motor 10. When the electrode reaches its top position, it opens top limit switch 43 thereby disconnecting raise field coil 29 and arresting further upward movement of the electrode.

Each electrode also has an individual raise control separate from the other electrodes which, when operated, opens switches 41 and 58 and closes switch 53. The result is exactly the same as when the master raise control is operated, except that only the individual electrode is raised.

A master lowering control is provided on the control panel. When it is operated it closes switch 67 (and like switches for the other two electrodes) thereby applying full power from transformer 48 to lower field coil 31. It does not disconnect raise field coil 29 so that if an arc is being maintained at the end of the electrode and a current is flowing, the electrode will be pulled down slowly. A lower limit switch 63 opens when the electrode holder reaches its lower most operating position, thereby disconnecting lower field coil 31 and limiting any further lowering. Slack cable limit switch 64 opens if the cable goes slack. Consequently, if the electrode hangs for any reason instead of moving downwardly by reason of hitting an obstruction or the like, the cable will go slack and immediately disconnect lower field coil 31, thereby preventing any further unwinding of the electrode hoist cable. An individual lowering switch 66 is also provided for electrode 6. Like individual lowering switches are also provided for the other two electrodes.

When timer control switch 81 is closed, as when the furnace begins to melt down a heat, timer 83 is energized through lead 84. It then switches to lead 85 which serves as a holding circuit to maintain the timer in operation. The timer is pre-set to operate for a desired period of time at which time it closes switch 89 momentarily. The setting of timer 83 is adjusted according to operating conditions. When melting down of a charge begins, the electrodes ordinarily strike an arc to a pile of scrap which has been charged. As heat is generated, a hole will develop beneath each electrode due to melting of scrap in the arc, and the electrode will slowly bore downwardly into the scrap until they approach the bottom of the furnace. The scrap around the electrodes is held away from them by the magnetic field generated by the current in the electrodes. When the electrodes reach a position near the bottom, it is then desirable to withdraw them to permit the unmelted scrap to cave in to the melt in the furnace and then to charge additional scrap and again advance the electrodes to the metal and resume heating. The time which is required will vary according to the size of the furnace and operating practices, but the initial melt down may be, by way of example, about an hour.

Timer 83 is set to operate for the length of time which is concluded to be necessary before withdrawing the electrodes. When that time has elapsed, timer 83 closes the switch 89 momentarily connecting timer 87 to the line through wire 88. Timer 87 then transfers to a holding circuit through lead 90. When timer 87 is energized, it closes switch 95 and holds it closed for a pre-set time. Ordinarily timer 87 is pre-set to hold switch 95 closed for about one and one-half minutes. When switch 76 is closed for automatic control, closing of switch 95 causes relays 78 and 79 to be energized. They open switches 39 and 60 (FIGURE 2) and switch 118 (FIGURE 4) and at the same time close switch 51 (FIGURE 2). Opening switch 60 disconnects lower field coil 31 from any power source. Opening switch 39 disconnects raise field coil 29 from current connection 21. Closing of switch 51 places full voltage across coil 29 from autotransformer 48. Opening switch 118 places resistor 119 in series with field coil 115, thereby reducing the field strength of motor 10. Accordingly, a full raise field is supplied to generator 34 and a reduced field is provided for motor 10, thereby causing electrode 6 to be raised at the maximum possible speed, which is faster than normal automatic operating speed. When electrode 6 reaches its top limit, top limit switch 43 is opened, thereby disconnecting raise field 29 and maintaining only a holding current which is supplied through resistor 50. The scrap in the furnace then is free to cave in. At the end of the pre-set period, timer 87 opens switch 95 which restores the circuit to normal operating conditions. The electrodes are then caused to move downwardly in the manner previously described until an arc is struck, at which time the electrodes withdraw under automatic control until they have reached a proper operating position.

Electrode top limit switches 92, 93, and 94 are opened when the respective electrodes are withdrawn to their top position. When all three electrodes are so withdrawn, then the circuit through switches 92, 93, and 94 is broken and timer 91 begins to operate. If it continues to operate for a pre-set time of approximately five minutes, it opens switch 86 and holds it open until power is again restored through one of switches 92, 93, or 94, and then closes switch 86. Timer 83 then recycles and begins timing a new melt down cycle. The only time when all three electrodes are withdrawn for the period sufficient to operate timer 86, is when they are withdrawn to permit the roof to be swung back and a new charge added. Accordingly, when a new charge is added, the melt down cycle begins again from the time when the furnace is charged.

Overcurrent relays 25, 26, and 27 are set to operate at a current which is less than that required to trip the main breaker. By way of example, on a furnace having a normal operating current of 30,000 amperes, the main breaker may be set to trip if the current exceeds 120,000 amperes. Overcurrent relays 25, 26, and 27 are adjusted to operate if the current exceeds 50,000 amperes. It will be understood that the current which operates relays 25, 26, and 27 is a relatively small control current which is proportional to the current in the electrode leads. When any one of relays 25, 26, or 27 operates, it closes the associated switch 69, 70, or 71. If switch 76 is closed for automatic operation, closing of any of switches 69, 70, or 71 energizes timer 123. Timer 123 is adjusted to close switch 77 after the timer has been in operation for a pre-set period which may be, for example, about three-fourths of a second. When switch 77 is closed, it connects relays 78 and 79 across the line and causes them to operate. This causes operation of switches 39, 51, 60, and 118, and of like switches for the other two electrodes and produces an immediate fast withdrawal of all of the electrodes. As the arcs lengthen, their resistance will increase and the current will drop until it is again within normal operating limits. Overcurrent relays 25, 26, and 27 are deenergized as the current becomes smaller, and the connected switches are opened. This, in turn, deenergizes timer 123, causes switch 77 to open, and deenergizes relays 78 and 79 to restore the system to automatic operation.

When relay 96 is energized, it holds switches 97 and 98 in closed position. The switches open if the power to relay 96 is interrupted. Switch 99 is on the circuit breaker lock out control and is opened if the circuit breaker is locked out. Switches 100, 101, and 102 are on the lock out controls for the three electrodes. If any of switches 99, 100, 101, and 102 is opened, then circuit breaker control relay 96 opens switches 97 and 98.

Switch 112 is an auxiliary switch in the circuit breaker mechanism. When the circuit breaker is opened, switch 112 is closed. When it is closed by opening of the circuit breaker, and switch 97 is closed by reason of the circuit breaker being not locked out, relays 78 and 79 will be connected across lines 72 and 73. If the circuit breaker is locked out, there will, of course, be no circuit since switch 97 will be opened. Accordingly, if the circuit breaker trips but is not locked out, relays 78 and 79 will operate causing the electrodes to be raised at full speed.

If all three electrodes are withdrawn to their top most position, top limit switches 109, 110, and 111 close. If control switch 108 is closed and the circuit breaker is not locked out thereby opening switch 98, a circuit is completed between lines 103 and 104 through circuit breaker closing relay 105. Accordingly, when the electrodes are fully withdrawn, relay 105 is actuated to close circuit breaker switch 13 and open switch 112.

A push button 107 is provided to operate relay 105 for manual reclosing of the circuit breaker.

The operation of the furnace is substantially automatic under all operating conditions. When the furnace is first put on heat, it melts down for an initial time determined by timer 82. At the end of that time, timer 87 is energized thereby operating relays 78 and 79 and causing withdrawal of the electrodes for a brief period of time. Withdrawal of the electrodes permits the scrap in the furnace to cave in and substantially level itself for further melting and refining. If the electrodes are withdrawn and the roof swung back for recharging, timer 91 will be tripped and will reset timer 83 to begin a new melt down cycle. If, however, there is only a brief interruption, as occurs if the electrode holders are raised to permit the clamps to be loosened and the electrodes slipped downwardly in the holders, timer 91 is not activated since the time involved is shorter than the time preset on timer 91. The timing circuits can be made inoperative if desired by opening selector switch 81.

If there is an overcurrent in any of the phases which is sustained for longer than a period set on timer 123, then relays 78 and 79 are energized by closing of switch 77 causing withdrawal of the electrodes at maximum speed. When the overcurrent ends, the apparatus again reverts to automatic operation. Withdrawal of the electrodes on overloading and operation of the control relay is optionally omitted by opening control switch 76.

Tripping of the main circuit breaker causes automatic withdrawal of electrodes by operation of switch 112. When all of the electrodes have been withdrawn, the circuit breaker is immediately reclosed, automatically opening switch 112 and restoring the apparatus to automatic operation. Automatic withdrawal of the electrodes and reclosing of the circuit breaker is avoided by opening selector switch 108.

From the foregoing it will be seen that when the apparatus is operated to its fullest extent, it causes the electrodes to be raised on an overcurrent to limit the overcurrent. It also causes the electrodes to be raised if the circuit breaker trips and then recloses the circuit breaker and restores the apparatus to automatic operation. The apparatus further causes a raising of the electrodes after an initial melt down to permit cave in or collapsing of the scrap so that refining can begin. Numerous advantages are thereby produced. The apparatus prevents surge loads in the electric furnace shop and avoids low power factor operation. It greatly reduces the number of circuit breaker operations and thereby extends the life of the circuit breaker contacts and of the circuit breaker mechanism. The apparatus prevents electrode breakage from cave ins by causing withdrawal of the electrodes to begin before a damaging cave in can occur. The apparatus provides continuity of operation substantially independently of an operator, thereby reducing the time the furnace is down while the furnace operator attends to another furnace or until he notices that the circuit breaker has tripped and must be reset. The apparatus further maintains an automatic cycle and resets itself in the event a second charge to the furnace is necessary. The apparatus produces substantial savings in the cost of operating electric furnaces, in the number of electrodes used, and in the cost of power. It thereby increases their efficiency to a marked degree.

While I have illustrated and described a present preferred embodiment of my invention, it is to be understood that I do not limit myself thereto, and that the invention may be otherwise variously practiced within the scope of the following claims.

I claim:

1. Position control apparatus for an electric furnace electrode comprising electrode drive means, electrode current sensing means, electrode voltage sensing means, said current sensing means producing an electrode drive means electrode current signal in response to the electrode current, said current signal being in controlling relation to said electrode drive means said voltage sensing means producing an electrode drive means electrode voltage signal in response to the electrode voltage, said voltage signal being in controlling relation to said electrode drive means, said current and voltage signals acting in conjunction to cause the electrode drive means to raise and lower the electrode in response to both of said signals, and second electrode current sensing means responsive to the electrode current and in controlling relationship to the electrode drive means and to the current and voltage signals whereby the electrode drive means raises the electrode in response to the second electrode current sensing means and independently of the current and voltage signals when the electrode current exceeds a predetermined limit.

2. Position control apparatus for an electric furnace electrode comprising electrode drive means, electrode current sensing means, electrode voltage sensing means, said current sensing means producing an electrode drive means electrode current signal proportional to the electrode current, said current signal being in controlling relation to said electrode drive means to bias said drive means to raise the electrode, said voltage sensing means producing an electrode drive means electrode voltage signal proportional to the electrode voltage, said voltage signal being in controlling relation to said electrode drive means to bias said drive means to lower the electrode, and second electrode current sensing means responsive to the electrode current and in controlling relationship to the electrode drive means and to the current and voltage signals whereby the electrode drive means raises the electrode in response to the second electrode current sensing means and independently of the current and voltage signals when the electrode current exceeds a predetermined limit.

3. Position control apparatus for an electric furnace electrode comprising electrode voltage sensing means, first electrode current sensing means, electrode drive means operable to raise and lower said electrode within the furnace, said voltage sensing means and said current sensing means being in controlling relationship to said electrode drive means whereby said electrode drive means raises and lowers said electrode responsive to the electrode voltage and current, second electrode current sensing means in controlling relationship to said electrode drive means and to said voltage sensing means and said first current sensing means whereby said electrode drive means raises said electrode in response to said second electrode current sensing means and independently of the voltage sensing means and first current sensing means when the electrode current exceeds a predetermined limit.

4. Position control apparatus for a plurality of electric furnace electrodes comprising for each electrode, electrode voltage sensing means, electrode current sensing means, electrode drive means operable to raise and lower said electrode within the furnace, said voltage sensing means and said current sensing means being in controlling relationship to said electrode drive means whereby said electrode drive means raises and lowers said electrode responsive to the electrode voltage and current, overcurrent sensing means arranged for all of the electrodes of said furnace and placed in controlling relationship to the electrode drive means of all said electrodes and the signals to the electrode drive means produced by the voltage and current sensing means, said overcurrent sensing means being actuated by an overcurrent in any electrode and controlling all the electrode drive means to raise all of the electrodes independently of the current and voltage sensing means when an overcurrent develops in any electrode.

5. Position control apparatus for a plurality of electric furnace electrodes comprising for each electrode, electrode voltage sensing means, electrode current sensing means, electrode drive means operable to raise and lower said electrode within the furnace, said voltage sensing means and said current sensing means being in controlling relationship to said electrode drive means whereby said electrode drive means raises and lowers said electrode responsive to the electrode voltage and current, overcurrent sensing means arranged for all of the electrodes of said furnace, timing means actuated by said overcurrent sensing means when there is an overcurrent in any electrode, said timing means being in controlling relationship to the raising and lowering means and to electrode voltage and current sensing means for all the electrodes and controlling the electrode raising and lowering means to raise all of the electrodes when an overcurrent continues for at least a pre-set period of time, said overcurrent sensing means being arranged to continue to sense the electrode current and returning the system to normal operation under control of the said voltage sensing means and said current sensing means when the overcurrent ceases.

6. Position control apparatus for an electric furnace electrode having electrode drive means arranged to raise and lower said electrode, electrode voltage and current sensing means in controlling relationship to the electrode drive means to raise and lower the electrode responsive to the electrode current and voltage, and timing means activating said electrode drive means and operating said electrode drive means to raise the electrode upon the expiration of a pre-set time independently of said voltage and current sensing means and then to lower said electrode.

7. Position control apparatus for an electrode of an electric furnace comprising electrode drive means effective to raise and lower said electrode, electrode voltage and current sensing means in controlling relationship to the electrode drive means effective to raise and lower the electrode responsive to the electrode current and voltage, timing means which begin timing a pre-set cycle at the commencement of operation of said furnace, said timing means being in controlling relationship to said electrode drive means and overriding said voltage and current sensing means, said timing means at the end of a pre-set time causing the electrode drive means to raise the electrode momentarily and then return it to normal operation.

8. Position control apparatus for an electrode of an electric furnace comprising electrode drive means effective to raise and lower said electrode, electrode voltage and current sensing means in controlling relationship to the electrode drive means effective to raise and lower the electrode responsive to the electrode current and voltage, first timing means which begin timing a pre-set cycle at the commencement of operation of said furnace, said timing means being in controlling relationship to said electrode drive means and overriding said voltage and current sensing means, said timing means at the end of a pre-set time causing the electrode drive means to raise the electrode momentarily and then return it to normal operation, and second timing means which reset the first timing means if all of the furnace electrodes are raised for longer than a pre-set time during the cycle of the first timing means.

9. Position control apparatus for an electrode of an electric furnace comprising electrode drive means effective to raise and lower said electrode, electrode voltage and current sensing means in controlling relationship to the electrode drive means whereby said drive means raise and lower the electrode responsive to the electrode current and voltage, first timing means in controlling relationship to said electrode drive means, said timing means causing the electrode drive means to raise said electrode momentarily independently of the electrode voltage and current sensing means at the end of a pre-set period of time, and then to return the electrode to operating level, and second timing means actuated when the furnace is inactive and which reset said first timing means when the furnace is inactive for longer than a pre-set period of time.

10. In an electric furnace installation having a plurality of electrodes and a power supply line, an electrode control system comprising electrode drive means operable to raise and lower said electrodes, electrode voltage and current sensing means in controlling relationship to said electrode drive means whereby the drive means are operated to raise and lower the electrodes responsive to changes in the electrode voltage and current, circuit breaker means in electrical circuit with the furnace power supply line, said circuit breaker being tripped and disconnecting the furnace from the power supply when an excessive current is reached in the power supply line, and means in controlling relationship to the electrode drive means and the circuit breaker means independently of the voltage and current sensing means and activated by tripping of the circuit breaker to control the electrode drive means to raise the electrodes at accelerated speed independently of the voltage and current sensing means and to reclose the circuit breaker.

11. In an electric furnace installation having a plurality of electrodes and a power supply line equipped with circuit breaker means, an electrode control system comprising electrode drive means operable to raise and lower said electrodes, electrode voltage and current sensing means in controlling relationship to said electrode drive means whereby the drive means are operated to raise and lower the electrodes responsive to changes in the electrode voltage and current, switch means associated with said circuit breaker and operated when said circuit breaker is opened by an excessive current to operate the electrode drive means to raise the electrodes at accelerated speed independently of the voltage and current sensing means, and circuit breaker closing means actuated when the electrodes are raised to close the circuit breaker and restore the electrode drive means to normal control.

12. Control apparatus for an electric furnace comprising a plurality of electrodes arranged for movement up and down in said furnace, electrode drive means for each electrode operable to move said electrode up and down, voltage and current sensing means for each electrode and in controlling relationship to the electrode drive means whereby the electrode is moved up and down responsive to the electrode voltage and current, control means in controlling relationship to all the electrode drive means and operable to cause all the electrodes to be raised independently of the electrode voltage and current, timing means in controlling relationship to said control means and arranged to operate said control means after the furnace has been on heat for a pre-set period of time whereby the electrodes are withdrawn after an initial heating period, overcurrent sensing means in controlling relationship to said control means and arranged to operate said control means when there is an overcurrent in any of the electrodes whereby the electrodes are withdrawn when an overcurrent exists, circuit breaker means in controlling relationship to said control means and arranged to operate said control means when the circuit breaker is opened, and circuit breaker closing means operated by the electrodes when they are raised.

References Cited by the Examiner
UNITED STATES PATENTS

| | | | |
|---|---|---|---|
| 2,669,673 | 2/54 | Geiseman et al. | 314—75 |
| 3,097,252 | 7/63 | Robinson | 13—13 |

RICHARD M. WOOD, *Primary Examiner.*

JOSEPH V. TRUHE, *Examiner.*

UNITED STATES PATENT OFFICE
CERTIFICATE OF CORRECTION

Patent No. 3,217,205 November 9, 1965

George A. Bennett

It is hereby certified that error appears in the above numbered patent requiring correction and that the said Letters Patent should read as corrected below.

Column 12, lines 57 and 58, strike out "independently of the voltage and current sensing means" and insert the same after "drive means" in line 57, same column 12; column 14, line 13, for "Geiseman" read -- Geiselman --.

Signed and sealed this 27th day of September 1966.

(SEAL)
Attest:

ERNEST W. SWIDER
Attesting Officer

EDWARD J. BRENNER
Commissioner of Patents